United States Patent [19]

Kern

[11] 3,938,678

[45] Feb. 17, 1976

[54] CARGO TRANSPORT SYSTEM

[76] Inventor: Ruy E. Kern, 1032 Kerri Ann Drive, Martinez, Calif. 94553

[22] Filed: Sept. 18, 1974

[21] Appl. No.: 507,234

[52] U.S. Cl............... 214/38 D; 214/515; 214/620; 280/415 R
[51] Int. Cl.².......................................... B65G 67/02
[58] Field of Search.......... 214/38 B, 38 BA, 38 BB, 214/38 D, 515, 516, 517, 620, 621, 750; 280/415 R, 415 A

[56] References Cited
UNITED STATES PATENTS

| | | | |
|---|---|---|---|
| 2,087,249 | 7/1937 | Fitch | 214/516 X |
| 2,514,752 | 7/1950 | Faulkner et al. | 214/38 D X |
| 3,207,085 | 9/1965 | Burr | 214/620 X |
| 3,369,684 | 2/1968 | Ford | 214/515 |
| 3,514,001 | 5/1970 | De Meritt et al. | 214/620 |
| 3,791,544 | 2/1974 | Moses | 214/750 |

*Primary Examiner*—Robert G. Sheridan
*Attorney, Agent, or Firm*—Flehr, Hohbach, Test, Albritton, & Herbert

[57] ABSTRACT

A system for handling and transporting cargo. The system includes a pallet specially adapted for use with a container or truck trailer having an internal volume defined by top and bottom walls, side walls, a front end wall, and a closure wall at the rear end. The pallet includes a frame carried on a plurality of rollers for movement into the container. The frame is adapted to carry a cargo load having exterior dimensions commensurate generally with the interior dimensions of the container. A push plate is mounted at one end of the pallet frame, and the push plate is formed with a pair of pockets adapted to lockably receive the tines of a forklift truck for moving the pallet. A pair of lock pins are mounted on an end of the pallet frame for engaging with sockets formed in the bottom wall of the container to preclude relative movement of the pallet with respect to the container.

2 Claims, 5 Drawing Figures

U.S. Patent  Feb 17, 1976  3,938,678
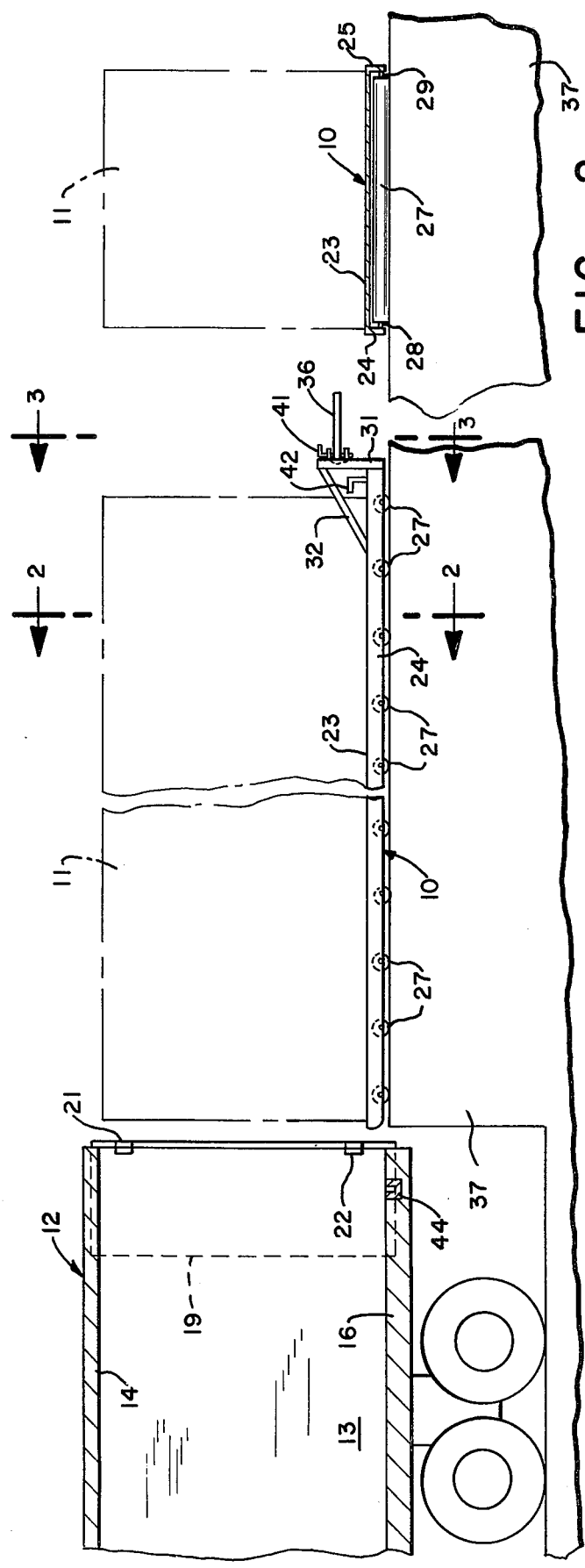
FIG.-1
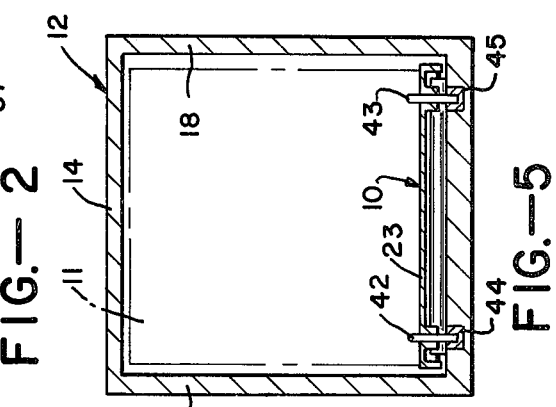
FIG.-2
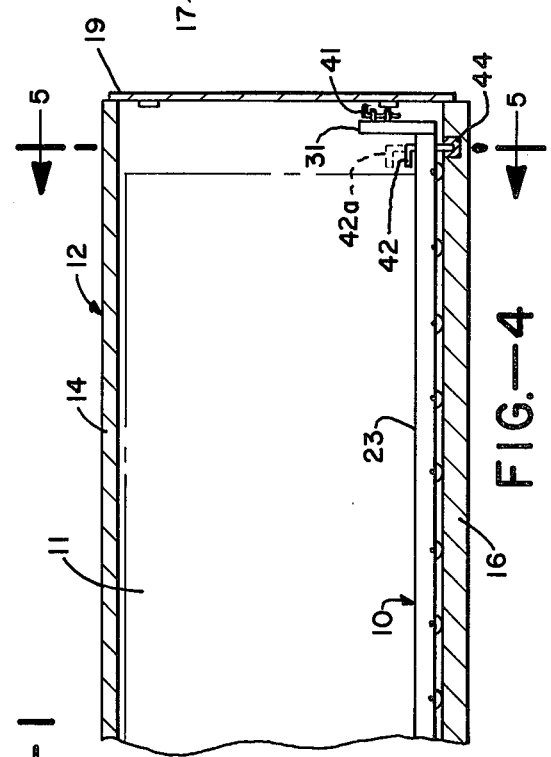
FIG.-4
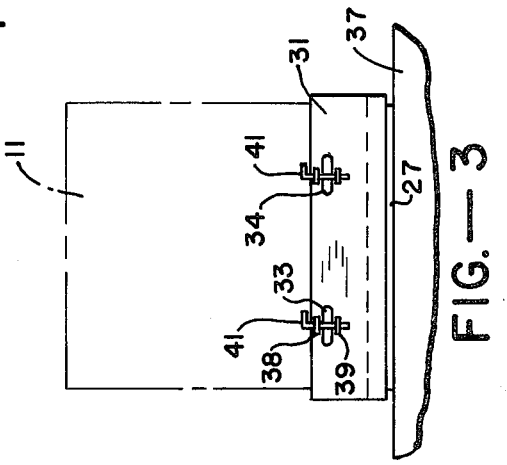
FIG.-3
FIG.-5

CARGO TRANSPORT SYSTEM

BACKGROUND OF THE INVENTION

This invention relates to the handling and transport of cargo and freight by means such as containers or truck trailers.

A great deal of progress has been achieved in freight handling and transport through improved methods of shipping and packaging cargo and freight. These methods include containerization of cargo and improved truck trailer handling procedures which have speeded up the transport of freight.

However, even with the advances which have been made in this field there still exists a bottleneck in the flow of freight at the loading and unloading stages. The loading and unloading procedures for many types of cargo is extremely slow. The result is that the equipment is tied up and valuable transit time is lost because of the time required for loading or unloading the containers or trailers.

In containerized cargo procedures such as where a container is loaded with cargo and the container is then loaded on the transport vehicle, such as a ship, quick turn-around-time is essential in view of high shipping costs. However, containers of the foregoing nature are in short supply so that there is a great need for decreasing the turn-around-time of the equipment to reduce lost time and increase equipment utilization. Presently the trailers and containers are inefficiently utilized and waste a great deal of money where they may be idle for as long as a number of days to be loaded or unloaded.

The foregoing problem is compounded where the containers and trailers may be forced on shippers or receivers when not convenient to their loading or unloading schedules. A greater expense is thus incurred because odd hours of loading are required and slow cargo handling methods must be employed.

OBJECTS AND SUMMARY OF THE INVENTION

It is a general object of the invention to provide a new and improved system for the handling and transport of cargo and freight by means such as containers or truck-trailers.

Another object is to provide a system of the type described which decreases the time for loading and unloading a container or truck-trailer. This in turn decreases the turn-around-time of the equipment at the shipping or receiving point so that equipment utilization is increased, more efficient and easier loading and unloading procedures are utilized, more containers and trailers are made available for transport duty, and shipping costs are reduced.

Another object is to provide a system of the type described which incorporates a roller pallet which is specially adapted to be pre-loaded with cargo and then rapidly moved into a container or truck-trailer. The pallet is sized so that the exterior dimensions of the load of cargo are generally commensurate with the interior dimensions of the container or trailer.

Another object is to provide a roller pallet for use in a system of the type described in which a push plate is mounted at one end of the pallet with the plate being formed with pockets adapted to lockably receive the tines of a forklift truck for moving the pallet.

Another object is to provide a roller pallet of the type described which incorporates cooperative locking means adapted to lock the pallet and cargo within the container or trailer.

BRIEF DESCRIPTION OF THE DRAWINGS

FIG. 1 is a side elevational view, partially in cross-section, illustrating the system of the invention;

FIG. 2 is a cross-sectional view taken along the line 2—2 of FIG. 1;

FIG. 3 is an end elevation view taken along the line 3—3 of FIG. 1;

FIG. 4 is a fragmentary longitudinal section view of the trailer of FIG. 1 illustrating the pallet and cargo locked in position within the trailer; and FIG. 5 is a cross-sectional view taken along the line 5—5 of FIG. 4.

DESCRIPTION OF THE PREFERRED EMBODIMENT

In the drawings FIG. 1 illustrates the cargo transport system of the invention which incorporates a roller pallet 10, shown as supporting a typical cargo load 11, with the pallet being specially adapted for use in combination with a container or truck trailer 12. While the invention will be described in relation to the trailer 12 of a truck-trailer unit, it is understood that the invention also has application to containerized cargo systems employing unitized containers which are adapted to be loaded onto ships for transport to destination.

Container or trailer 12 defines an interior volume 13 bounded by a top wall 14, bottom wall 16, a pair of side walls 17, 18, a front end wall, not shown, and closure doors 19 at the rear end. The doors are mounted to the trailer side walls by hinges 21, 22 with the doors shown in open position in FIG. 1 and in closed position in FIG. 4.

Pallet 10 includes an elongate frame 23 having a rectangular peripheral configuration and size commensurate generally with the plan configuration and size of trailer bottom wall 16. Frame 23 is formed with a pair of downwardly extending skirts 24 and 25, as best illustrated in FIG. 2. A plurality of rollers 27 are mounted on parallel, transversely extending axes by means of stub axles 28, 29 which are supported in suitable bearings secured to the frame skirts. The height of the pallet from the bottom of the rollers to the cargo supporting surface of the frame is relatively short, preferably on the order of six inches, to accommodate a large cargo. The length of the pallet is selected according to the particular container or trailer with which it is to be used. The pallet length would be 20', 24', 27', 30', 35' or 40' to correspond with the various trailer sizes which have been standardized throughout the industry. On longer trailers, such as 40 foot trailers, a pair of 20 foot pallets could be used end-to-end within the trailer.

Force receiving means is provided for purposes of moving the pallet, and this means includes an upstanding push plate 31 mounted at its lower end to the rear end of pallet frame 23. A pair of cross braces 32 are mounted from the upper side corners of plate 31 to the frame sides. The rearwardly extending face of plate 31 is formed with a pair of transversely spaced recesses or pockets 33, 34. The pockets are sized and spaced apart a sufficient dimension to receive the tip ends of a pair of tines 36 of a forklift truck which is provided at the shipping or receiving location. The forklift truck can thereby impart a thrust force to the pallet for moving it along the shipping platform 37 and into the trailer.

A pair of tine locks are provided on push plate 31 for locking tines 36 within the pockets. The tine locks each include a pair of rearwardly extending brackets 38, 39 mounted to the plate on opposite top and bottom sides of a respective pocket. A lock pin 41 is mounted for vertical movement through aligned holes formed in each pair of brackets. Corresponding holes are formed in the tips of the tines so that with the tines in the pockets the openings are aligned for receiving the pins. With the pins in their locking positions a pull force can be transmitted from the forklift truck to the pallet for purposes such as moving the pallet out of the trailer and onto the platform.

Locking means is provided for locking the pallet against relative movement within the trailer. The locking means includes a pair of lock pins 42, 43 mounted in transversely spaced openings formed in the rear end corners of pallet frame 23, as illustrated in FIG. 5. A pair of sockets 44, 45 are formed in bottom wall 16 of the trailer at positions which are in vertical register with respective lock pins 42, 43 when the pallet is positioned within the trailer. These lock pins are adapted to move between a raised or retracted position 42a and the lowered or locking position shown in solid line in the drawings. A suitable latch, such as a spring detent, not shown, may be provided in the pallet frame to hold the lock pins in either of their retracted and locking positions. In the retracted position of the lock pins the pallet is free to be moved into or out of the trailer. In the locking position the pins engage with the respective sockets and preclude relative movement between the pallet and trailer so that the cargo is secured for transport. In addition, the lock pins would prevent unintended rearward movement of a loaded pallet when the trailer may be parked on a rearward incline and the doors are opened.

In operation of the invention, pallet 10 is preloaded, at the convenience of the shipper, with the freight or cargo. The cargo 11 is loaded to the height, width and length which approximates the interior dimensions of the trailer. When the empty trailer 12 arrives its rear doors 19 are opened and it is backed up to abut platform 37, as shown in FIG. 1. The tines of the forklift truck are then inserted into the pockets of push plate 31 and the truck is operated for rapidly pushing the loaded pallet into the trailer to the position shown in FIG. 4. In this position of the pallet lock pins 42, 43 are in register with sockets 44, 45. The pins are then manually moved downwardly into the sockets for locking the pallet in place. Rear doors 19 of the trailer are then closed and the truck-trailer is driven to its destination.

At the destination the procedure is reversed with the trailer doors opened and the trailer backed up to abut the receiving dock. Another forklift truck is then maneuvered so that the tips of its tines are inserted within sockets 33, 34 of the push plate. Locking pins 41 are then dropped through the aligned openings for locking the tines to the pallet and the forklift truck is backed away for pulling the pallet and its load from the trailer. It will be realized that this unloading procedure takes only a relatively short time, on the order of a few minutes, so that the truck-trailer can be immediately dispatched to another destination. The pallet can then be unloaded at the convenience of the receiver.

While the foregoing embodiment is at present considered to be preferred it is understood that numerous variations and modifications may be made therein by those skilled in the art and it is intended to cover in the appended claims all such variations and modifications as fall within the true spirit and scope of the invention.

I claim:

1. For use in a cargo transport system which includes a forklift truck which incorporates tines having tips, the combination of a container having an interior volume defined by top and bottom walls, a pair of side walls, a front end wall, and a closure at the rear end, a pallet adapted for insertion into and removal from the container, the pallet including a rectangular frame for supporting a load of cargo, the frame having its outer peripheral dimensions substantially commensurate with the peripheral dimensions of the bottom wall of the container, a plurality of rollers mounted on the frame about parallel axes extending transversely of the frame, said rollers being adapted to support the frame and cargo load for rolling movement onto the bottom wall of the container, an upstanding push plate secured at its lower end to one end of the frame, means forming a pair of spaced-apart pockets in the plate for receiving thrust forces from the tips of the tines of the forklift truck, means for locking the tips of the tines within said pockets for imparting pulling forces to the pallet, at least one lock pin mounted for movement on the pallet between a retracted position and downwardly extending locking position, and pin receiving means in the container positioned in register with the locking means when the pallet is carried within the container, said lock pin when in its locking position being engaged in said pin receiving means for precluding relative movement of the pallet with respect to the container.

2. In a system for transporting cargo by means of containers each of which has an interior volume defined by top and bottom walls, a pair of side walls, a front end wall and a closure at the rear end, said system further including a forklift truck having tines, the combination of a frame adapted to contain a cargo load having exterior dimensions commensurate generally with the dimensions of the interior volume of one of said containers, a plurality of rollers mounted on the frame about parallel transversely extending axes whereby the rollers support the frame for rolling movement across the bottom wall with the height of the frame being substantially less than the height of the interior volume of the container, an upstanding push plate mounted at one end of the frame, means forming pockets in the push plate for receiving the tines whereby thrust forces can be imparted to the pallet from the forklift truck, means on the push plate for locking said tines within said pockets, cooperative locking means on the pallet including at least one lock member adapted to move between a retracted position and a locking position, said lock member being positioned on the pallet in vertical register with a pin receiving socket in the container when said pallet is positioned within the container, said lock member in its locking position being in engagement with the pin receiving socket for preventing relative movement of the pallet with respect to the container.

\* \* \* \* \*